United States Patent Office 3,794,661
Patented Feb. 26, 1974

3,794,661
TRIAZOLYL CARBAMATES
Beat Boehner, Binningen, and Dag Dawes, Pratteln, Switzerland, assignors to Ciba-Geigy Corporation, Ardsley, N.Y.
No Drawing. Filed Jan. 26, 1972, Ser. No. 221,052
Claims priority, application Switzerland, Feb. 4, 1971, 1,634/71; Jan. 7, 1972, 274/72
Int. Cl. C07d 55/06
U.S. Cl. 260—308 R    5 Claims

ABSTRACT OF THE DISCLOSURE

Triazolyl carbamates of the formula $$\begin{array}{c} R_1-N-\!\!\!-\!\!\!-N \quad\;\; O \quad\; R_3 \\ \;\;\;| \quad\quad\quad\;\; \| \quad\;\; \| \;\; / \\ R_2-C \quad\quad C-O-C-N \\ \;\;\;\;\;\backslash N / \quad\quad\quad\quad \backslash R_4 \end{array}$$

wherein $R_1$ represents hydrogen, alkyl or cycloalkyl, $R_2$ represents hydrogen, alkyl or the groups —$COOR_1$—, $CO$—$N(R_3)(R_4)$ or —CN, $R_3$ represents hydrogen, alkyl, alkoxy or alkinyl, $R_4$ represents alkyl, alkenyl, alkinyl, alkoxy, cycloalkyl or phenyl, and $R_3$ and $R_4$ together with the nitrogen atom to which they are bonded, represents a heterocyclic radical, their manufacture and their use in pest control.

---

The present invention relates to new triazolyl carbamates, their manufacture and their use in pest control.

The alkoxy, alkyl, alkenyl and alkinyl chains repre- $$\begin{array}{c} R_1-N-\!\!\!-\!\!\!-N \quad\;\; O \quad\; R_3 \\ \;\;\;| \quad\quad\quad\;\; \| \quad\;\; \| \;\; / \\ R_2-C \quad\quad C-O-C-N \\ \;\;\;\;\;\backslash N / \quad\quad\quad\quad \backslash R_4 \end{array} \quad (I)$$

wherein $R_1$ represents hydrogen, alkyl or cycloalkyl, $R_2$ represents hydrogen, alkyl or the groups —$COOR_1$, —$CO$—$N(R_3)(R_4)$ or —CN, $R_3$ represents hydrogen, alkyl, alkoxy or alkinyl, $R_4$ represents alkyl, alkenyl, alkinyl, alkoxy, cyclokyl or phenyl, and $R_3$ and $R_4$ together with the nitrogen atom to which they are bonded, represents a heterocyclic radical.

The alkoxy, alkyl, alkenyl and alkinyl chains represented by $R_1$, $R_2$, $R_3$ and $R_4$ respectively contain from 1 to 18 or 2 to 18 carbon atoms (in the case of the alkenyl and alkinyl radicals), but contain preferably 1 to 4 or 2 to 4 carbon atoms. These radicals may be branched or straight-chain, unsubstituted or substituted. Examples of such radicals include: methyl, methoxy, trifluoromethyl, ethyl, ethoxy, cyanoethyl, propyl, isopropyl, n-, i-, sec.- and tert.butyl, allyl, crotonyl, methallyl, propargyl or n-butinyl.

The cycloalkyl radicals represented by $R_1$ and $R_4$ have 3 to 7, preferably 5 or 6 ring members. The phenyl radical which may be represented by $R_4$ may be unsubstituted or substituted.

The substituents at the alkoxy alkyl, alkenyl, alkinyl and phenyl radicals may be of the first or second order.

The substituents at the alkyl, alkenyl, alkinyl, acyl, naphthyl and phenyl radicals may be of the first or second order.

By substituents of the first order are meant electron donors which increase the basicity. These include the following groups: halogen atoms, for example fluorine, chlorine, bromine, or iodine, alkoxy and alkylthio groups containing from 1 to 4 carbon atoms and which may be branched or unbranched, but are preferably unbranched and contain from 1 to 2 carbon atoms; lower alkoxyalkyl and alkyl groups, to which the definitions given hereinabove also apply here; secondary and tertiary amino groups, preferred substituents being lower alkyl and alkanoyl groups; hydroxyl and mercapto groups. The naphthyl and phenyl radical may also be substituted by alkyl, mono- and dihalogenoalkyl groups.

By substituents of the second order are meant acidifying electron donors. These include the following groups: nitro and cyano groups; trihalogenoalkyl groups, in which halogen represents preferably fluorine or chlorine; lower alkylsulphinyl and lower alkylsulphonyl groups which contain a branched or unbranched alkyl radical having 1 to 4 carbon atoms, preferably one unbranched alkyl radical having 1 to 2 carbon atoms; sulphamyl and sulphamido groups, it being possible for the amino groups to carry one or two substituents, preferably lower alkyl groups, as defined hereinabove.

Particular importance attaches to compounds of the formula $$\begin{array}{c} R_5-N-\!\!\!-\!\!\!-N \quad\;\; O \quad\; R_7 \\ \;\;\;| \quad\quad\quad\;\; \| \quad\;\; \| \;\; / \\ R_6-C \quad\quad C-O-C-N \\ \;\;\;\;\;\backslash N / \quad\quad\quad\quad \backslash R_8 \end{array} \quad (II)$$

wherein $R_5$ represents hydrogen, $C_1$-$C_6$ alkyl or $C_3$-$C_6$ cycloalkyl, $R_6$ represents hydrogen, $C_1$-$C_4$ alkyl or the groups —$COOR_5$, —$CO$—$N(R_7)(R_8)$, $R_7$ represents hydrogen or $C_1$-$C_4$ alkyl and $R_8$ represents $C_1$-$C_4$ alkyl, $C_1$-$C_4$ alkoxy or phenyl.

Pre-eminent compounds of the Formula II have the following formula:

$$\begin{array}{c} R_9-N-\!\!\!-\!\!\!-N \quad\;\; O \quad\; R_{11} \\ \;\;\;| \quad\quad\quad\;\; \| \quad\;\; \| \;\; / \\ R_{10}-C \quad\quad C-O-C-N \\ \;\;\;\;\;\backslash N / \quad\quad\quad\quad \backslash R_{12} \end{array} \quad (III)$$

wherein $R_9$ represents $C_1$-$C_6$ alkyl, cyclopentyl or cyclohexyl, $R_{10}$ represents hydrogen, $C_1$-$C_4$ alkyl or the groups $$-COOH_3, \; COOC_2H_5 \text{ or } -CON\!\!\begin{array}{c}{\diagup CH_3}\\{\diagdown CH_3}\end{array}$$

$R_{11}$ represents hydrogen, methyl or ethyl and $R_{12}$ represents methyl, ethyl, methoxy or phenyl.

The compounds of the Formula I may be manufactured according to methods which are in themselves known, for example by (a) Reacting a hydroxy-triazole of the formula $$\begin{array}{c} R_1-N-\!\!\!-\!\!\!-N \\ \;\;\;| \quad\quad\quad\;\; \| \\ R_2-C \quad\quad N-OH \\ \;\;\;\;\;\backslash N / \end{array} \quad (IV)$$

with a carbamyl halide of the formula $$\begin{array}{c} O \quad\; R_3 \\ \| \;\; / \\ Hal-C-N \\ \quad\quad \backslash R_4 \end{array} \quad (V)$$

or $$\begin{array}{c} O \quad\; R_3 \\ \| \;\; / \\ Hal-C-N \\ \quad\quad \backslash H \end{array} \quad (VI)$$

in the presence of an acid binding agent, or (b) Reacting a salt of a hydroxy-triazole of the Formula IV with a carbamyl halide of the Formula V or VI, or (c) Reacting a hydroxy-triazole of the Formula IV with phosgene and reacting the intermediate product with a compound of the formula $$HN\!\!\begin{array}{c}{\diagup R_3}\\{\diagdown R_4}\end{array} \quad (VII)$$

or $H_2N$—$R_3$ (VIII)   or $H_2N$—$R_4$ (IX)

In the Formulae IV to IX, the symbols $R_1$ to $R_4$ have the meanings given for the Formula I. Hal represents fluorine, chlorine, bromine or iodine, but especially chlorine or bromine.

As salts of hydroxy-triazoles of the Formula IV which are suitable for the process of the invention there may be used, for example, salts of monovalent metals, in particular the alkali metal salts, such as the sodium or potassium salts.

As acid binding agents the following bases may for example be used: tertiary amines, such as triethylamine, dimethyl aniline, pyridine, pyridine bases; inorganic bases, such as hydroxides and carbonates of alkali and alkaline earth metals, preferably sodium and potassium carbonate.

It is advisable to carry out the reaction in inert solvents, of which the following may be cited as examples which are suitable for the purpose: aromatic hydrocarbons, such as benzene, toluene, xylenes, gasolines, chlorobenzene, polychlorobenzenes, bromobenzene; chlorinated alkanes containing from 1 to 3 carbon atoms; ethers, such as dioxan or tetrahydrofuran; esters, such as ethyl acetate; ketones, such as acetone, methyl ethyl ketone, diethyl ketone.

Some of the starting material of the Formula IV are known compounds. They may be manufactured according to processes which are known in the art, for example by reacting a correspondingly substituted semi-carbazide with orthoformic acid esters.

The compounds of the Formula I have a broad biocidal activity spectrum and may be used for combating various vegetable and animal pests and as growth regulators.

In particular, the compounds of the Formula I possess insecticidal properties and may be used against all development stages such, for example, as eggs, larvae, pupae, nymphs and adults of insects and representatives of the order acarina, for example against insects of the families:

| | |
|---|---|
| Teltigonidae | Tenebrionidae |
| Gryllidae | Chrysomelidae |
| Gryllotalpidae | Bruchidae |
| Blattidae | Tineidae |
| Peduviidae | Noctindae |
| Phyrrhocoriae | Lymatriidae |
| Cimicidae | Pyralidae |
| Delphacidae | Culicidae |
| Aphididae | Tipulidae |
| Diaspididae | Stomoxydae |
| Pseudococcidae | Trypetidae |
| Scarabaeidae | Muscidae |
| Dermestidae | Calliphoridae |
| Coccinellidae | Pulicidae |

The insecticidal action can be substantially broadened and adapted to the particular circumstances by the addition of other insecticides.

Suitable additives include, for example, the following active substances.

ORGANIC DERIVATIVES OF PHOSPHORUS

Bis-O,O-diethylphosphoric acid anhydride (TEPP)
Dimethyl-(2,2,2-trichloro-1-hydoxyethyl)-phosphonate (trichlorfon)
1,2-dibromo-2,2-dichloroethyldimethylphosphate (naled)
2,2-dichlorovinyldimethylphosphate (diclorvos)
2-methoxycarbamyl-1-methylvinyldimethylphosphate (mevinphos)
Dimethyl-1-methyl-2-(methylcarbamoyl)-vinylposphate cis (monocrotophos)
3-(dimethoxyphosphinyloxy)-N,N-dimethyl-cis-crotonomide (dicrotophos)
2-chloro-2-diethylcarbamoyl-1-methylvinyldimethylphosphate (phosphamidon)
O,O-diethyl-O (or S)-2-(ethylthio)-ethylthiophosphate (demeton)
S-ethylthioethyl-O,O-dimethyl-dithiophosphate (thiometon)
O,O-diethyl-S-ethylmercaptomethyldithiophosphate (phorate)
O,O-diethyl-S-2-ethylthio)ethyldithiophosphate (disulfoton)
O,O-dimethyl-S-2(ethylsulphinyl) ethylthiophosphate (oxydementon methyl)
O,O-dimethyl-S-(1,2-dicarbethoxyethyldithiophosphate) (malathion)
O,O,O,O-tetraethyl-S,S'-methylene-bis-dithiophosphate (ethion)
O-ethyl-S,S-dipropyldithiophosphate
O,O-dimethyl-S-(N-methyl-N-formylcarbamoylmethyl)-dithiophosphate (formothion)
O,O-dimethyl-S-(N-methylcarbamoylmethyl) dithiophosphate (dimethoate)
O,O-dimethyl-O-p-nitrophenylthiophosphate (parathion-methyl)
O,O-diethyl-O-p-nitrophenylthiophosphate (parathion)
O-ethyl-O-p-nitrophenylphenylthiophosphate (EPN)
O,O-dimethyl-O-(4-nitro-m-tolyl)thiophosphate (fenitrothion)
O,O-dimethyl-O-2,4-5-trichlorophenylthiophosphate (ronnel)
O-ethyl-O,2,4,5-trichlorophenylethylthiophosphate (trichloronate)
O,O-dimethyl-O-2,5-dichloro-4-bromophenylthiophosphate (bromophos)
O,O-dimethyl-O-(2,5-dichloro-4-jodphenyl)-thiophosphate (jodofenphos)
4-tert. butyl-2-chlorophenyl-N-methyl-O-methylamidophosphate (crufomate)
O,O-dimethyl-O-(3-methyl-4-methylmercaptophenyl)thiophosphate (fenthion)
Isopropylamino-O-ethyl-O-(4-methylmercapto-3-methylphenyl)-phosphate
O,O-diethyl-O-p-(methylsulphinyl)phenyl-thiophosphate (fensulfothion)
O-p-(dimethylsulphamido)phenyl-O,O,-dimethylthiophosphate (famphur)
O,O',O'-tetramethyl-O,O'-thiodi-p-phenylenethiophosphate
O-ethyl-S-phenyl-ethyldithiophosphate
O,O-dimethyl-O-(α-methylbenzyl-3-hydroxycrotonyl)phosphate
2-chloro-1-(2,4-dichlorophenyl) vinyl-diethylphosphate (chlorfenvinphos)
1-chloro-1-(2,4,5-trichlorophenyl)vinyl-dimethylphosphate
O-[2-chloro-1-(2,5-dichlorophenyl)]vinyl-O,O-diethylthiophosphate
Phenylglyoxylonitriloxim-O-O-diethylthiophosphate (phoxim)
O,O-diethyl-O-(3-chloro-4-methyl-2-oxo-2-H-1-benzopyran-7-yl)-thiophosphate (coumaphos)
2,3-p-dioxandithiol-S,S-bis(O,O-diethyldithiophosphate) (dioxathion)
5-[(6-chloro-2-oxo-3-benzoxazolinyl)methyl] O,O-diethyldithiophosphate (phosalone)
2-(diethoxyphosphinylimino)-1,3-dithiolane
O,O-dimethyl-S-[2-methoxy-1,3,4-thiadiazol-5-(4H-onyl-(4)-methyl]dithiophosphate
O,O-diethyl-S-phthalimidomethyl-dithiophosphate (imidan)
O,O-diethyl-O-(3,5,6-trichloro-2-pyridyl)thiophosphate
O,O-diethyl-O-2-pyrazinylthiophosphate (thionazin)
O,O-diethyl-O-(2-isopropyl-4-methyl-6-pyrimidyl)thiophosphate (diazinon)
O,O-diethyl-O-(2-chinoxalyl)thiophosphate
O,O-dimethyl-S-(4-oxo-1,2,3-benzotrazin-3(4H)-ylmethyl)-dithiophosphate (azinphosmethyl)
O,O-diethyl-S-(4-oxo-1,2,3-benzotriazin-3(4H)-ylmethyl)-dithiophosphate (azinphosethyl)

S-[(4,6-diamino-s-triazin-2-yl)methyl]-O,O-dimethyl-dithiophosphate (menazon)
O,O-dimethyl-O-(3-chloro-4-nitrophenyl)thiophosphate (chlorthion)
O,O-dimethyl-O (or S)-2-(ethylthioethyl)thiophosphate (demeton-S-methyl)
2-(O,O-dimethyl-phosphoryl-thiomethyl)-5-methoxy-pyron-4-3,4-dichlorobenzyl-triphenylphosphonium chloride
O,O-diethyl-S-(2,5-dichlorophenylthiomethyl)dithio-phosphate (phenkapton)
O,O-diethyl-O-(4-methyl-cumarinyl-7-)-thiophosphate (potasan)
5-amino-bis(dimethylamido)phosphinyl-3-phenyl-1,2,4-triazole (triamiphos)
N-methyl-5-(O,O-dimethylthiolphosphoryl)-3-thiavaleramide (vamidothion)
O,O-diethyl-O-[2-dimethylamino-4-methylpyrimidyl-(6)]-thiophosphate (dioctyl)
O,O-dimethyl-S-(methylcarbamoylmethyl)-thiophosphate (omethoate)
O-ethyl-O-(8-quinolinyl)-phenylthiophosphonate (oxinothiophos)
O-methyl-S-methyl-amidothiophosphate (monitor)
O-methyl-O-(2,5-dichloro-4-bromophenyl)-benzothiophosphate (phosvel)
O,O,O,O-tetrapropyldithiophosphate
3-(dimethoxyphosphinyloxy)-N-methyl-N-methoxy-cis-crotonamide
O,O-dimethyl-S-(N-ethylcarbamoylmethyl)dithio-phosphate (ethoate-methyl)
O,O-diethyl-S-(N-isopropylcarbamoylmethyl)-dithio-phosphate (prothoate)
S-N-(1-cyano-1-methylethyl)carbamoylmethyldiethyl-thiolphosphate (cyanthoate)
S-(2-acetamidoethyl)-O,O-dimethyldithiophosphate
Hexamethylphosphoric acid triamde (HEMPA)
O,O-dimethyl-O-(2-chloro-4-nitrophenyl)thiophosphate (dicapthon)
O,O-dimethyl-O-p-cyanophenyl thiophosphate (cyanox)
O-ethyl-O-p-cyanophenylthiophosphonate
O,O-diethyl-O-2,4-dichlorophenylthiophosphate (dichlorfenthion)
O,2,4-dichlorophenyl-O-methylisopropylamidothio-phosphate
O,O-diethyl-O-2,5-dichloro-4-bromophenylthiophosphate (bromophos-ethyl)
Dimethyl-p-(methylthio)phenylphosphate
O,O-dimethyl-O-p-sulfamidophenylthiophosphate
O-[p-(p-chlorophenyl)azophenyl]O,O-dimethylthio-phosphate (azothoate)
O-ethyl-S-4-chlorophenyl-ethyldithiophosphate
O-isobutyl-S-p-chlorophenyl-ethyldithiophosphate
O,O-dimethyl-S-p-chlorophenylthiophosphate
O,O-dimethyl-S-(p-chlorophenylthiomethyl)dithio-phosphate
O,O-diethyl-p-chlorophenylmercaptomethyl-dithio-phosphate (carbophenothion)
O,O-diethyl-S-p-chlorophenylthiomethyl-thiophosphate
O,O-dimethyl-S-(carbethoxy-phenylmethyl)dithio-phosphate (phenthoate)
O,O-diethyl-S-(carbofluorethoxy-phenylmethyl)-dithio-phosphate
O,O-dimethyl-S-carboisopropoxy-phenylmethyl)-dithio-phosphate
O,O-diethyl-7-hydroxy-3,4-tetramethylene-coumarinyl-thiophosphate (coumithoate)
2-methoxy-4-H-1,3,2-benzodioxaphosphorin-2-sulphide
O,O-diethyl-O-(5-phenyl-3-isooxazolyl)thiophosphate
2-(diethoxyphosphinylimino)-4-methyl-1,3-dithiolane
Tris-(2-methyl-1-aziridinyl)-phosphine oxide (METEPA)
S-(2-chloro-1-phthalimidoethyl)-O,O-diethyldithio-phosphate
N-hydroxynaphthalimido-diethylphosphate Dimethyl-3,5,6-trichloro-2-pyridylphosphate
O,O-dimethyl-O-(3,5,6-trichloro-2-pyridyl)thiophosphate
S-2-(ethylsulphonyl)ethyl dimethylthiolphosphate (dioxydemeton-S-methyl)
Diethyl-S-2-(ethylsulphinyl)ethyl dithiophosphate (oxidisulfoton)
Bis-O,O-diethylthiophosphoric acid anhydride (sulfotep)
Dimethyl-1,3-di(carbomethoxy)-1-propen-2-yl-phosphate
Dimethyl-(2,2,2-trichloro-1-butyroyloxyethyl)phosphate (butonate)
O,O-dimethyl-O-(2,2-dichloro-1-methoxy-vinyl)phosphate
Bis-(dimethylamido)fluorphosphate (dimefox)
3,4-dichlorobenzyl-triphenylphosphoniumchloride
Dimethyl-N-methoxymethylcarbamoylmethyl-dithio-phosphate (formocarbam)
O,O-diethyl-O-(2,2-dichloro-1-chloroethoxyvinyl) phosphate
O,O-dimethyl-O-(2,2-dichloro-1-chloroethoxyvinyl) phosphate
O-ethyl-S,S-diphenyldithiolphosphate
O-ethyl-S-benzyl-phenyldithiophosphonate
O,O-diethyl-S-benzyl-thiolphosphate
O,O-dimethyl-S-(4-chlorophenylthiomethyl)dithiophosphate (methylcarbophenothion)
O,O-dimethyl-S-(ethylthiomethyl)dithiophosphate
Diisopropylaminofluorophosphate (Mipafox)
O,O-dimethyl-S-(morpholinylcarbamoylmethyl)dithio-phosphate (morphothion)
Bismethylamido-phenylphosphate
O,O-dimethyl-S-(benzene sulphonyl)dithiophosphate
O,O-dimethyl-(S and O)-ethylsulphinylethylthio-phosphate
O,O-diethyl-O-4-nitrophenylphosphate
Triethoxy-isopropoxy-bis(thiophosphinyl)disulphide
2-methoxy-4H-1,3,2-benzodioxaphosphorin-2-oxide
Octamethylpyrophosphoramide (schradan)
Bis (dimethoxythiophosphinylsulphido)-phenylmethane
N,N,N',N'-tetramethyldiamidofluorophosphate (dimefox)
O-phenyl-O-p-nitrophenyl-methanthiophosphonate (colep)
O-methyl-O-(2-chloro-4-tert.butyl-phenyl)-N-methyl-amidothiophosphate (narlene)
O-ethyl-O-(2,4-dichlorophenyl)-phenylthiophosphonate
O,O-diethyl-O-(4-methylmercapto-3,5-dimethylphenyl)-thiophosphate
4,4'-bis-(O,O-dimethylthiophosphoryloxy)-diphenyl disulphide
O,O-di-(β-chloroethyl)-O-(3-chloro-4-methyl-coumarinyl-7)-phosphate
S-(1-phthalimidoethyl)-O,O-diethyldithiophosphate
O,O-dimethyl-O-(3-chloro-4-diethylsulphamylphenyl)-thiophosphate
O-methyl-O-(2-carbisopropoxyphenyl)-amidothiophosphate
5-(O,O-dimethylphosphoryl)-6-chloro-bicyclo(3.2.0)-heptadiene (1,5)
O-methyl-O-(2-i-propoxycarbonyl-1-methylvinyl)-ethylamido-thiophosphate.

FORMAMIDINES 1-dimethyl-2-(2'-methyl-4-'chlorophenyl)-formamidine (chlorphenamidin)
1-methyl-2-(2'-methyl-4'-chlorophenyl)-formamidine
1-methyl-2-(2'-methyl-4'-bromophenyl)-formamidine
1-methyl-2-(2',4'dimethylphenyl)-formamidine
1-n-butyl-1-methyl-2-(2'-methyl-4'-chlorophenyl)-formamidine
1-methyl-1-(2'-methyl-4'-chloroaniline-methylene)-formamidine
2-(2'''-methyl-4'''-chlorophenyl)-formamidine
1-n-butyl-2-(2'-methyl-4'-chlorophenyl-imino)-pyrolidine.

UREA

N-2-methyl-4-chlorophenyl-N',N'-dimethyl-thiourea.

CARBAMIC ACID DERIVATIVES 1-naphthyl-N-methylcarbamate (carbaryl)
2-butinyl-4-chlorophenylcarbamate
4-dimethylamino-3-tolyl-N-methylcarbamate (aminocarb)
4-methylthio-3,5-xylyl-N-methylcarbamate (methiocarb)
2-chlorophenyl-N-methylcarbamate (CPMC)
1-(dimethylcarbamoyl)-5-methyl-3-pyrazolyl-N,N-dimethylcarbamate (dimethilan)
2,3-dihydro-2,2-dimethyl-7-benzofuranyl-N-methylcarbamate (carbofuran)
2-methyl-2-methylthiopropional-O-(methylcarbamoyl)-oxime (aldicarb)
8-quinaldyl-N-methylcarbamate and salts thereof
3-isopropyl-5-methylphenyl-N-methylcarbamate (promecarb)
2-(1,3-dioxolan-2-yl)-phenyl-N-methylcarbamate (dioxacarb)
2-(4,5-dimethyl-1,3-dioxalan-2-yl)-phenyl-N-methylcarbamate
2-(1,3-dithiolan-2-yl)-N,N—dimethylcarbamate
2-(1,3-dithiolan-2-yl)-phenyl-N,N-dimethylcarbamate
2-isopropoxyphenyl-N-methylcarbamate (aprocarb)
4-diallylamino-3,5-xylyl-N-methylcarbamate (allyxicarb)
1-isopropyl-3-methylpyrazol-5-yl-N,N-dimethylcarbamate (isolan)
1-methylthioethylimino-N-methylcarbamate (methomyl).

CHLORINATED HYDROCARBONS

γ-Hexachlorocyclohexane [gammexane; lindan; γHCH]
1,2,3,4,5,6,7,8-octachloro-3α,4,7,7α-tetrahydro-4,7-methylenindane [chlordan]
1,4,5,6,7,8,8-heptachloro-3α,4,7,7α-tetrahydro-4,7-methylenindane [heptachlor]
1,2,3,4,10,10-hexachloro-1,4,4α,5,8,8α-hexahydro-endo-1,4-exo-5,8-dimethanonaphthalene [aldrin]
1,2,3,4,10,10-hexachloro-6,7-epoxy-1,4,4α,5,6,7,8,8α-octahydro-exo-1,4-endo-5,6-dimethanenaphthalene [diflorin]
1,2,3,4,10,10-hexachloro-6,7-epoxy-1,4,4α,5,6,7,8,8α-octahydro-endo-endo-5,8-dimethanonaphthalene [endrin].

Moreover, the compounds of the Formula I possess nematocidal properties and may be used, for example, to combat the following plant parasitic nematodes: Meloidogyne spp., Heterodera spp., Ditylenchus spp., Pratylenchus spp., Paratylenchus spp., Anguina spp., Helicotylenchus spp., Tylenchorhynchus spp., Rotylenchulus spp., Tylenchulus semipenetrans, Radopholis similus, Belonolaismus spp., Trichodorus spp., Longidorus spp., Aphelenchoides spp., Xiphinema spp.

The compounds of the Formula I may be used as pure active substance or together with suitable carriers and/or additives. Suitable carriers and additives can be solid or liquid and correspond to the substances conventionally used in formulation technique such, for example, as solvents dispersants, wetting agents, adhesives, thickeners, binders and/or fertilizers.

For application, the compounds of the Formula I may be processed to dusts, emulsion concentrates, granules, dispersions, sprays, to solutions, or suspensions in the conventional formulation which is commonly employed in application terminology. Mention may also be made of "cattle dips" and "spray races," in which aqueous preparations are used.

The agents according to the invention are manufactured in known manner by intimately mixing and/or grinding active substances of the Formula I with the suitable carriers, optionally with the addition of dispersants or solvents which are inert towards the active substances.

The active substances may be available and can be used in the following forms.

Solid forms:
    Dusts, tracking agents, granules, coated granules, impregnated granules and homogeneous granules.

Liquid forms:
    (a) active substances which are dispersible in water: wettable powders, pastes, emulsions;
    (b) solutions.

To manufacture solid forms (dusts, tracking agents), the active substances are mixed with solid carriers. Suitable carriers are, for example: kaolin, talcum, bolus, loess, chalk, limestone, ground limestone, attaclay, dolomite, diatomaceous earth, precipitated silica, alkaline earth silicates, sodium and potassium aluminium silicates (feldspar and mica), calcium and magnesium sulphates, magnesium oxide, ground synthetic materials, fertilizers, for example amonium sulphate, ammonium phosphate, ammonium nitrate, urea, ground vegetable products, such as corn meal, bark dust, sawdust, nutshell meal, cellulose powder, residues of plant extractions, activated charcoal etc. These substances can either be used alone or in admixture with one another.

Granules can be very easily manufactured by dissolving an active substance of the Formula I in an organic solvent and applying the resulting solution to a granulated material, for example attapulgite, $SiO_2$, granicalcium, bentonite etc. and then evaporating the solvent.

Polymer granules can also be manufactured by mixing the active substances of the Formula I with polymerizable compounds (urea/formaldehyde; dicyandiamide/formaldehyde; melamine/formaldehyde or others), whereupon a mild polymerization is carried out that does not affect the active substances and in the process of which the granulation is carried out during the gel formation. It is more advantageous to impregnate finished, porous polymer granules (urea/formaldehyde, polyacrylonitrile, polyester or others) which have a specific surface area and a favorable predeterminable adsorption/desorption ratio, with the active substances, for example in the form of their solutions (in a low boiling solvent) and to remove the solvent. Polymer granules of this kind in the form of microgranules having a bulk density of 300 g./litre to 600 g./litre can also be manufactured with the aid of atomizers. The dusting can be carried out from aircraft over extensive areas of cultures of useful plants.

It is also possible to obtain granules by compacting the carrier with the active substance and carriers and subsequently comminuting the product.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, lignin sulfonic acids, their alkali metal and alkaline earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e. wettable powders, pastes and emulsifiable concentrates, are agents which can be diluted with water to any concentration desired. They consist of active substance, carrier, optionally additives which stabilize the active substance, surface-active substance and anti-foam agents and, optionally, solvents.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Suitable anti-foam agents are silicones.

The active substances are mixed, ground, sieved and strained with the additives mentioned above that, in wettable powder, the solid particle size of from 0.02 to 0.04 and in pastes, of 0.03 is not exceeded. To produce emulsifiable concentrates and pastes, dispersing agents such as those cited above, organic solvents and water are used. Examples of suitable solvents are the following: alcohols, benzene, xylenes, toluene, dimethyl sulfoxide, and mineral oil fractions boiling between 120 and 350° C. The solvents must be practically odorless, not phytotoxic, inert to the active substances and not readily inflammable.

Furthermore, the agents according to the invention can be applied in the form of solutions. For this purpose the active substance or several active substances of the General Formula I are dissolved in suitable organic solvents, mixtures of solvents or in water. Aliphatic and aromatic hydrocarbons, chlorinated derivatives thereof, alkyl naphthalenes, and mineral oils alone or mixed with each other, can be used as organic solvents.

The content of active substance in the above described agents is between 0.1% to 95%, in which connection it should be mentioned that in the case of application from aircraft or some other suitable means of application, it is possible to use concentrations of up to 99.5% or even pure active substance.

The active substances of the Formula I can, for example, be formulated as follows.

DUSTS

The following substances are used to manufacture (a) a 5% and (b) a 2% dust:

(a)

| | Parts |
|---|---|
| Active substance | 5 |
| Talcum | 95 |

(b)

| | Parts |
|---|---|
| Active substance | 2 |
| Highly disperse silica | 1 |
| Talcum | 97 |

The active substances are mixed with the carriers and ground.

GRANULES

The following substances are used to produce 5% granules:

| | Parts |
|---|---|
| Active substance | 5 |
| Epichlorhydrin | 0.25 |
| Cetyl polyglycol ether | 0.25 |
| Polyethylene glycol | 3.50 |
| Kaolin (particle size 0.3–0.8 mm.) | 91 |

The active substance is mixed with epichlorohydrin and dissolved with 6 parts of acetone; the polyethylene glycol and cetyl polyglycol ether are then added. The thus obtained solution is sprayed on to kaolin, and the acetone subsequently evaporated in vacuo.

WETTABLE POWDER

The following constituents are used for the preparation of (a) a 40%, (b) and (c) a 25%, and (d) a 10% wettable powder:

(a)

| | Parts |
|---|---|
| Active substance | 40 |
| Sodium lignin sulphonate | 5 |
| Sodium dibutyl-naphthalene sulphonate | 1 |
| Silica acid | 54 |

(b)

| | Parts |
|---|---|
| Active substance | 25 |
| Calcium lignin sulphonate | 4.5 |
| Champagne chalk/hydroxyethyl cellulose mixture (1:1) | 1.9 |
| Sodium dibutyl naphthalene sulphonate | 1.5 |
| Silica acid | 19.5 |
| Champagne chalk | 19.5 |
| Kaolin | 28.1 |

(c)

| | Parts |
|---|---|
| Active substance | 25 |
| Isooctylphenoxy-polyoxyethylene-ethanol | 2.5 |
| Champagne chalk/hydroxyethyl cellulose mixture (1:1) | 1.7 |
| Sodium aluminum silicate | 8.3 |
| Kieselguhr | 16.5 |
| Kaolin | 46 |

(d)

| | Parts |
|---|---|
| Active substance | 10 |
| Mixture of the sodium salts of saturated fatty alcohol sulphates | 3 |
| Naphthalenesulphonic acid/formaldehyde condensate | 5 |
| Kaolin | 82 |

The active substance are intimately mixed, in suitable mixers, with the additives, the mixture being then ground in the appropriate mills and rollers. Wettable powder are obtained which can be diluted with water to give suspensions of any desired concentration.

EMULSIFIABLE CONCENTRATES

The following substances are used to produce (a) a 10% and (b) a 25% emulsifiable concentrate:

(a)

| | Parts |
|---|---|
| Active substance | 10 |
| Epoxidized vegetable oil | 3.4 |
| Combination emulsifier consisting of fatty alcohol polyglycol ether and alkylarylsulphonate calcium salt | 13.4 |
| Dimethylformamide | 40 |
| Xylene | 43.2 |

(b)

| | Parts |
|---|---|
| Active substance | 25 |
| Epoxidized vegetable oil | 2.5 |
| Alkylarylsulphonate/fatty alcohol-polyglycol ether mixture | 10 |
| Dimethylformamide | 5 |
| Xylene | 57.5 |

From these concentrates it is possible to produce, by dilution with water, emulsion of any desired concentration.

SPRAY

The following constituents are used to prepare a 5% spray:

| | Parts |
|---|---|
| Active substance | 5 |
| Epichlorohydrin | 1 |
| Benzine (boiling limits 160°–190° C.) | 94 |

EXAMPLE 1

63.5 grams of 1-isopropyl-3-hydroxy-1,2,4-triazole and 69 g. of potassium carbonate in 1500 ml. of methyl ethyl ketone are refluxed for 1 hour.

After the mixture has cooled to room temperature, 54 g. of dimethyl carbamyl chloride in 100 ml. of methyl ethyl ketone are added dropwise thereto. The solution is heated again to the boil for 2 hours and after it has cooled, the salts are filtered off and the filtrate is concentrated. The liquid residue is taken up in methanol and cooled in a carbon dioxide/acetone bath to −70° C. The precipitated crystalline active substance of the formula

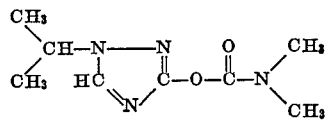

(M.P. 76–77° C.) is filtered off and dried for 6 hours in vacuo (40° C./15 mm. Hg). The following compounds are manufactured in analogous manner.

Compounds:
- N,N-dimethylcarbamoyl-[1-thyl-1,2,4-triazolyl-(3)]-ester; m.f.: 57–68° C.
- N,N-dimethylcarbamoyl-[1-n-propyl-1,2,4-triazolyl-(3)]-ester; m.f.: 55–58° C.
- N,N-dimethylcarbamoyl-[1-isopropyl-1,2,4-triazolyl-(3)]-ester; m.f.: 76–77° C.
- N,N-dimethylcarbamoyl-[1-n-butyl-1,2,4-triazolyl-(3)]-ester; m.f.: 31–35° C.
- N,N-dimethylcarbamoyl-[1-sec-butyl-1,2,4-triazolyl-(3)]-ester; m.f.: 44–53° C.
- N,N-dimethylcarbamoyl-[1-isobutyl-1,2,4-triazolyl-(3)]-ester; m.f.: 71–73° C.
- N,N-dimethylcarbamoyl-[1-sec.-pentyl-1,2,4-triazolyl-(3)]-ester; m.f.: 33–37° C.
- N,N-dimethylcarbamoyl-[1-n-hexyl-1,2,4-triazolyl-(3)]-esther; m.f.: 36–38° C.
- N,N-dimethylcarbamoyl-[1-cyclopentyl-1,2,4-triazolyl-(3)]-ester; $n_D^{20}$: 1.4969
- N,N-dimethylcarbamoyl-[1-ethyl-5-methyl-1,2,4-triazolyl-(3)]-ester; m.f.: 108–110° C.
- N,N-dimethylcarbamoyl-[1-isopropyl-5-methyl-1,2,4-triazolyl-(3)]-ester
- N,N-dimethylcarbamoyl-[1-isopropyl-5-ethoxycarbonyl-1,2,4-triazolyl-(3)]-ester; m.f.: 64° C.
- N,N-diethylcarbamoyl-[1-isopropyl-1,2,4-triazolyl-(3)]-ester; $n_D^{20}$: 1.4721
- N,N-dimethylcarbamoyl-[1-(1',2',2'-trimethylpropyl)-1,2,4-triazolyl-(3)]-ester; m.f.: 97–100° C.
- N,N-dimethylcarbamoyl-[1-(1'-ethylpropyl)-1,2,4-triazolyl-(3)]-ester; m.f.: 58–60° C.
- N,N-dimethylcarbamoyl-[1-isopropyl-5-ethyl-1,2,4-triazolyl-(3)]ester; m.f.: 83–85° C.
- N-methyl-N-methoxycarbamoyl-[1-isopropyl-1,2,4-triazolyl-(3)]-ester; m.f.: 62–65° C.
- N,N-dimethylcarbamoyl-[1-isopropyl-5-cyano-1,2,4-triazolyl-(3)]ester
- N,N-dimethylcarbamoyl-[1-sec-pentyl-1,2,4-triazolyl-(3)]-ester; $n_D^{20}$=1.4650
- N,N-dimethylcarbamoyl-[1,5-diisopropyl-1,2,4-triazolyl-(3)]ester.

EXAMPLE 2

(A) Insecticidal ingest poison action

Tobacco and potato plants were sprayed with a 0.05% aqueous emulsion (obtained from a 10% emulsifiable concentrate).

After the coating had dried, Egyptian cotton leaf worms (*Spodoptera literalis*) were settled on the tobacco plants and Colorado potato beetle larvae (*Leptinotarsa decemlineata*) on the potato plants. The test was carried out at 24° C. and 60% relative humidity.

The compounds according to Example 1 displayed an ingest poison action in the above test against *Spodoptera literalis* and *Leptinotarsa decemlineata*.

(B) Systemic insecticidal action

To determine the systemic action, rooted bean plants (*Vicia fabae*) were put into a 0.01% aqueous active substance solution (obtained from a 10% emulsifiable concentrate). After 24 hours, aphids (*Aphis fabae*) were placed on the parts of the plant above the soil. The aphids were protected from contact and gas action by means of a special device. The test was carried out at 24° C. and 70% relative humidity. In the above test the compounds according to Example 1 have a systemic action against *Aphis fabae*.

EXAMPLE 3

Action against soil nematodes

To test the action against soil nematodes, the active substance (in a concentration of 50 mmp.) is applied to and intimately mixed with soil infected with post gall nematodes (*Meloidgyne avenaria*). Immediately afterwards, tomato cuttings are planted in the thus prepared soil in a series of tests and after a waiting time of 8 days tomato seeds are sown in another test series.

In order to assess the nematocidal action, the galls present on the roots are counted 28 days after planting and sowing respectively. The compounds according to Example 1 display a nematocidal action in the above test.

What is claimed is:
1. A compound of the formula

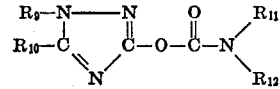

wherein $R_9$ represents $C_1$–$C_6$ alkyl, cyclopentyl or cyclohexyl, $R_{10}$ represents hydrogen, $C_1$–$C_4$ alkyl or the groups

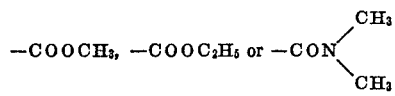

$R_{11}$ represents hydrogen, methyl or ethyl, and $R_{12}$ represents methyl, ethyl, methoxy and phenyl.

2. A compound according to claim 1 of the formula

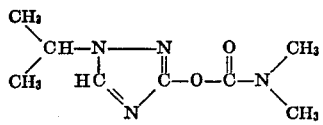

3. A compound according to claim 1 of the formula

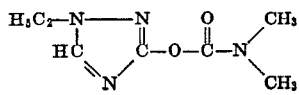

4. A compound according to claim 1 of the formula
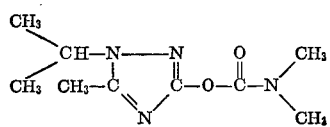
5. A compound according to claim 1 of the formula
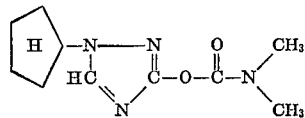
References Cited
FOREIGN PATENTS
281,946   7/1952   Switzerland _____ 260—308 R
281,960   7/1952   Switzerland _____ 260—308 R
681,376  10/1952   Great Britain _____ 260—308 R
OTHER REFERENCES
Fieser et al.: Organic Chemistry (D. C. Heath & Co., 1944), p. 296.
JOSEPH A. NARCAVAGE, Primary Examiner
U.S. Cl. X.R.
424—269